(12) United States Patent
Ryu et al.

(10) Patent No.: US 9,375,889 B2
(45) Date of Patent: Jun. 28, 2016

(54) METHOD FOR MANUFACTURING MULTILAYER STRUCTURE GOLF BALL

(75) Inventors: Hie Tack Ryu, Seongnam-si (KR); Jung Soo Kim, Chungcheongbukdo (KR); Jae Ho Lee, Chungcheongbukdo (KR); Kyung Ahn Moon, Seoul (KR)

(73) Assignee: VOLVIK INC., Eumseong-gun, Chungcheongbuk-do (KR)

( * ) Notice: Subject to any disclaimer, the term of this patent is extended or adjusted under 35 U.S.C. 154(b) by 312 days.

(21) Appl. No.: 14/007,009

(22) PCT Filed: Feb. 21, 2012

(86) PCT No.: PCT/KR2012/001310
§ 371 (c)(1),
(2), (4) Date: Sep. 24, 2013

(87) PCT Pub. No.: WO2012/128479
PCT Pub. Date: Sep. 27, 2012

(65) Prior Publication Data
US 2014/0015166 A1    Jan. 16, 2014

(30) Foreign Application Priority Data
Mar. 24, 2011    (KR) .................. 10-2011-0026468

(51) Int. Cl.
| | | |
|---|---|---|
| *B29C 43/14* | (2006.01) | |
| *B29C 43/20* | (2006.01) | |
| *B29D 99/00* | (2010.01) | |
| *A63B 45/00* | (2006.01) | |
| *A63B 37/00* | (2006.01) | |

(52) U.S. Cl.
CPC ........ *B29D 99/0042* (2013.01); *A63B 37/0003* (2013.01); *A63B 37/0076* (2013.01); *A63B 45/00* (2013.01); *B29C 43/203* (2013.01)

(58) Field of Classification Search
CPC .................... B29C 43/206; B29D 99/0042
See application file for complete search history.

(56) References Cited

U.S. PATENT DOCUMENTS

| | | | | |
|---|---|---|---|---|
| 2,537,089 A | * | 1/1951 | Rempel ................ | B29C 37/02 425/116 |
| 5,897,474 A | * | 4/1999 | Romero ................ | A63B 22/14 446/396 |
| 6,290,797 B1 | | 9/2001 | Gosetti et al. | |
| 6,436,327 B1 | * | 8/2002 | Cloutier ................ | B29C 31/08 264/248 |
| 6,645,414 B2 | | 11/2003 | Reid, Jr. et al. | |
| 7,407,378 B2 | | 8/2008 | Brum | |
| 2009/0075756 A1 | * | 3/2009 | Sullivan ............. | A63B 37/0003 473/354 |

(Continued)

FOREIGN PATENT DOCUMENTS

JP    2008-093879 A    4/2008

OTHER PUBLICATIONS

Kimura, JP 2008-093879 A Machine Translation, Apr. 2008.*

(Continued)

*Primary Examiner* — Ryan Ochylski
(74) *Attorney, Agent, or Firm* — Paratus Law Group, PLLC (57) ABSTRACT

Disclosed is a method of manufacturing a golf ball having a multilayer structure. The method uses a forming apparatus including an upper mold, a lower mold, and an intermediate mold. The upper mold and the lower mold include a plurality of hemispheric cavities, respectively. The intermediate mold includes a plurality of protrusions having smaller diameters than those of the cavities, on a top and a bottom to correspond to the cavities.

10 Claims, 12 Drawing Sheets

(56) References Cited

U.S. PATENT DOCUMENTS

2013/0140734 A1* 6/2013 Chou ............... B29D 99/0042 264/241
2014/0048974 A1* 2/2014 Molinari ........... B29D 99/0042 264/255

OTHER PUBLICATIONS

International Search Report for PCT/KR2012/001310 mailed Aug. 29, 2012 from Korean intellectual Property Office.

* cited by examiner

FIG. 12

METHOD FOR MANUFACTURING MULTILAYER STRUCTURE GOLF BALL

CROSS REFERENCE TO PRIOR APPLICATION

This application is a National Stage Patent Application of PCT International Patent Application No. PCT/KR2012/001310 (filed on Feb. 21, 2012) under 35 U.S.C. §371, which claims priority to Korean Patent Application No. 10-2011-0026468 (filed on Mar. 24, 2011), which are all hereby incorporated by reference in their entirety.

TECHNICAL FIELD

The present invention relates to a method of manufacturing a golf ball, and more particularly, to a method of manufacturing a golf ball having a multilayer structure.

BACKGROUND ART

Generally, except a one piece solid golf ball, a golf ball is formed of a multilayer structure in which a core is directly disposed or one or more intermediate layers are disposed in addition thereto and a cover surrounds the core.

In the case of such golf ball having the multilayer structure as described above, when the cover or the intermediate layer is formed of a thermoplastic material such as ionomor resin and thermoplastic elastomer, the cover or intermediate layers may be generally manufactured by injection molding.

In manufacturing a golf ball having a multilayer structure, a process of forming a cover may be easily performed by well-known injection molding. On the other hand, a general method of forming a core layer of a multilayer structure including one or more intermediate layers is performed by forming and taking out an uncross-linked outer core layer hemisphere by using a first press process, manually disposing an inner core layer in a corresponding hemisphere, and then cross-linking the output core layer hemisphere with the inner core layer by using a second press process.

However, in the case of such general method, since a process thereof is complicated, productivity is decreased. On the other hand, since it is difficult to maintain a uniform interval between the outer core layer and the inner core layer forming the intermediate layer, the quality of the golf ball is deteriorated.

DISCLOSURE OF THE INVENTION

Technical Problem

An aspect of the present invention provides a method of manufacturing a high-quality golf ball having a multilayer structure, appropriate for mass production of golf balls with an inner core layer with eccentricity removed.

Technical Solution

According to one or more embodiments of the present invention, a method of manufacturing a golf ball having a multilayer structure by using a forming apparatus including an upper mold and a lower mold including a plurality of hemispheric cavities, respectively, and an intermediate mold including a plurality of protrusions having smaller diameters than those of the cavities, on a top and a bottom to correspond to the cavities includes (a) locating a unit body for forming an outer layer into each of the protrusions on the top of the intermediate mold and each the cavities of the cavities of the lower mold while the upper mold and the lower mold are being separated from each other with a certain space therebetween and the intermediate mold is disposed in the space, (b) forming a pair of cup-shaped outer layers in a semi-cross-linked state in a space formed between the protrusions and the cavities by locating the protrusions on the top and bottom of the intermediate mold in corresponding cavities of the upper mold and the lower mold, respectively, (c) separating the upper mold and the lower mold from each other while the pair of semi-cross-linked cup-shaped outer layers attached to the inside of the cavities, (d) taking the intermediate mold outwardly, (e) locating inner layers having a globular shape, previously formed, in the cavities of the lower mold, and (f) cross-linking the pair of cup-shaped outer layers with the globular inner layers by facing the upper mod and the lower mold with each other.

According to one or more embodiments of the present invention, a method of manufacturing a golf ball having a multilayer structure by using a forming apparatus including an upper mold and a lower mold including a plurality of hemispheric cavities, respectively, and an intermediate mold including a plurality of protrusions having smaller diameters than those of the cavities, on a top and a bottom to correspond to the cavities includes (a) separating the upper mold and the lower mold from each other and locating a unit body for forming an outer layer in the cavity of the lower mold, (a-1) locating the unit body for forming the outer layer on the protrusion on the top of the intermediate mold, (a-2) locating the intermediate mold between the upper mold and the lower mold, (b) forming a pair of cup-shaped outer layers in a semi-cross-linked state in a space formed between the protrusions and the cavities by locating the protrusions on the top and bottom of the intermediate mold in corresponding cavities of the upper mold and the lower mold, respectively, (c) separating the upper mold and the lower mold from each other while the pair of semi-cross-linked cup-shaped outer layers attached to the inside of the cavities, (d) taking the intermediate mold outwardly, (e) locating inner layers having a globular shape, previously formed, in the cavities of the lower mold, and (f) cross-linking the pair of cup-shaped outer layers with the globular inner layers by facing the upper mod and the lower mold with each other.

In this case, a central portion of the protrusion may be cut to be flat.

In this case, a pin for fastening the unit body for forming the outer layer may be protruded from the central portion of the protrusion.

Also, the operations of (b) and (c) may be performed by transferring the lower mold vertically while fastening the upper mold.

Also, a radius of the protrusion may be identical to that of the inner layer.

Also, the intermediate layer may be taken outwardly by using a cylinder in the operation of (d).

Also, the method may further include an element for appropriately disposing the intermediate mold between the upper mold and the lower mold.

Advantageous Effects

According to the method according to the present embodiment, a high quality golf ball having a multilayer structure with an inner core layer with eccentricity removed may be mass-produced.

MODE FOR CARRYING OUT THE INVENTION

Hereinafter, exemplary embodiments of the present invention will be described in detail with reference to the attached drawings. In the drawings, like reference numerals designate like element. Also, in the overall specification, when it is described that a part "comprises" an element, if there is no particular mention, this means that the part may further include another element, instead of excluding the other element. On the other hand, in the respective drawings with respect to unit processes, a component of a forming apparatus, which does not relate to a corresponding process, is omitted.

Figure 1:
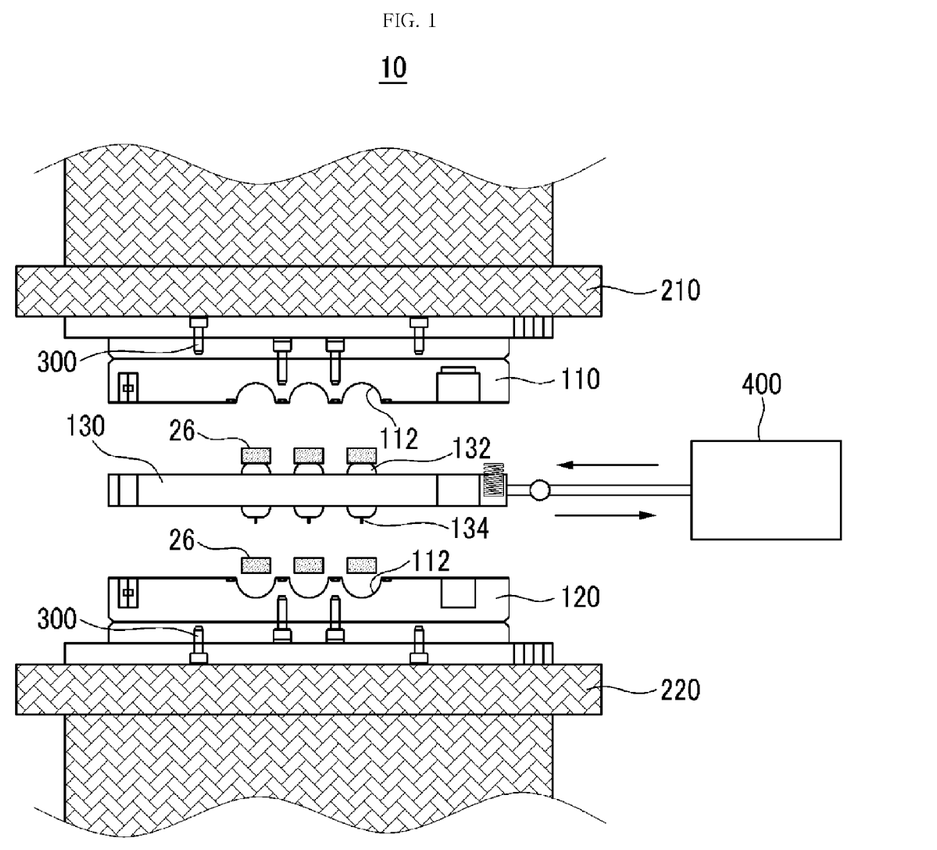
FIG. 1 is a process view illustrating an operation of locating a unit body for forming an outer layer of a golf ball having a multilayer structure according to an embodiment of the present invention.

An apparatus for forming a golf ball having a multilayer structure and operations thereof according to an embodiment of the present invention will be described. Referring to FIG. 1, a forming apparatus 10 for manufacturing a golf ball having a multilayer structure according to an embodiment of the present invention includes an upper mold 110, a lower mold 120, and an intermediate mold 130 entering and exiting between the upper mold 110 and the lower mold 120.

The upper mold 110 and the lower mold 120 are mounted on an upper press 210 and a lower press 220 by using bolts 300, respectively. During a process of manufacturing a golf ball, at least one of the upper press 210 and the lower press 220 is vertically driven by a drive device (not shown) such as a hydraulic motor to be in touch with each other or separated from each other. Also, the vertically driving the upper press 210 and/or the lower press 220 may be guide to a vertical straight line movement by using a guide bar (not shown) provided at corners of the presses.

Figure 7:
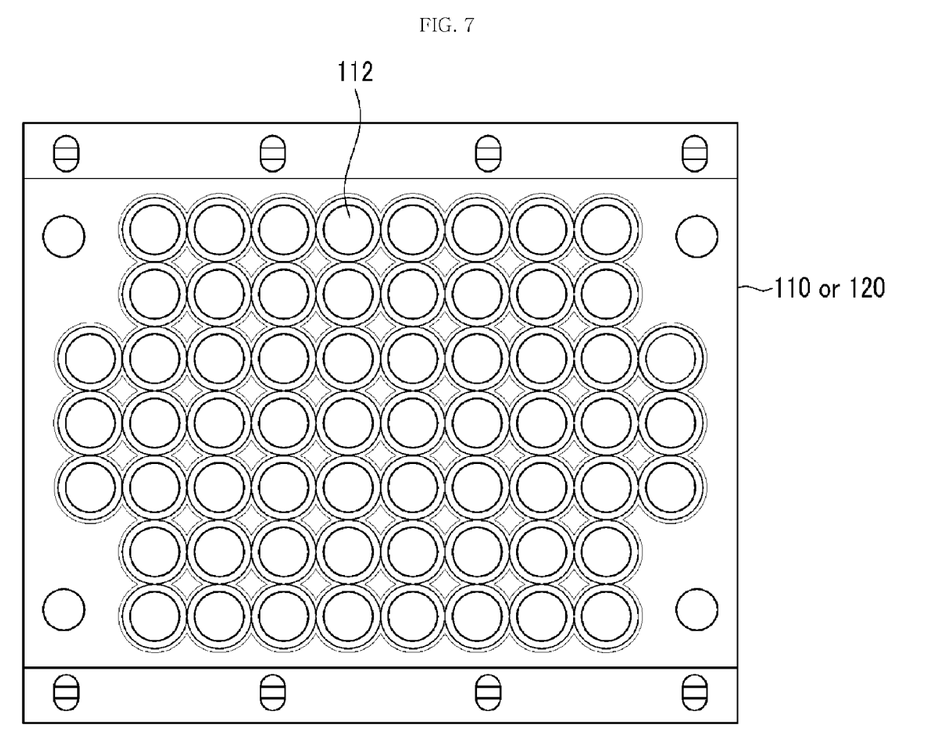
FIG. 7 is a top view illustrating the upper mold and the lower mold.

Referring to FIGS. 1 and 7, the upper mold 110 and the lower mold 120 are provided as symmetrically identical shapes and a plurality of cavities 112 for forming a core outer layer of the golf ball having the multilayer structure is provided as a hemisphere shape in the upper mold 110 and the lower mold 120, respectively. A diameter of the hemispherical cavity 112 may vary with a size of a core layer.

Figure 8:
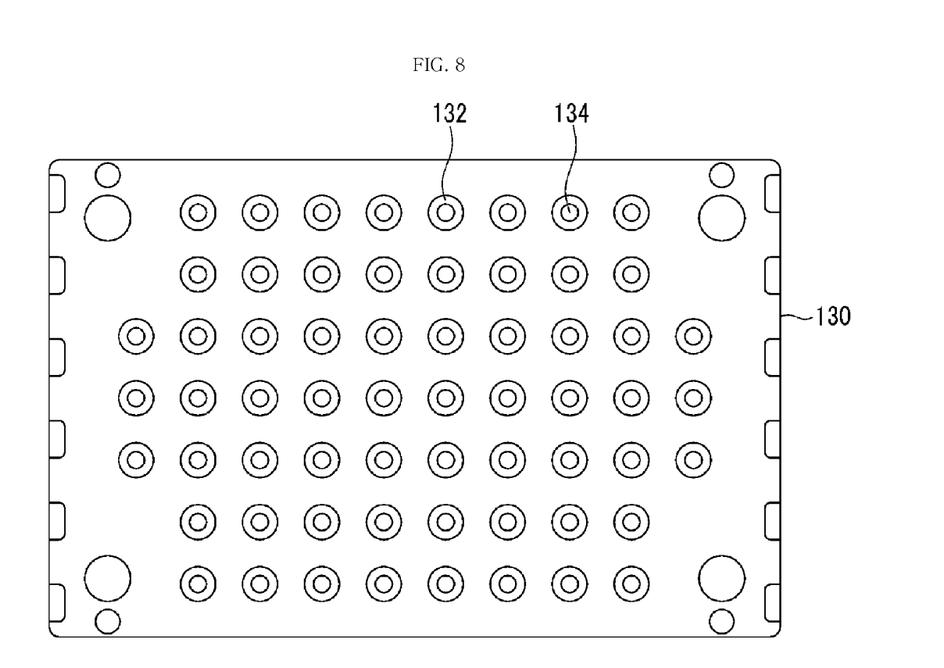
FIG. 8 is a top view illustrating the intermediate mold.

Referring to FIGS. 1 and 8, the intermediate mold 130 for forming the core outer layer of the golf ball having the multilayer structure as a cup shape is provided between the upper mold 110 and the lower mold 120. On the intermediate mold 130, a plurality of protrusions 132, which may correspond to and be contained in the plurality of cavities 112 of the upper mold 110 and the lower mold 120, is provided as a hemisphere shape.

A diameter of the protrusion 132 is approximately identical to a diameter of an inner layer that will be described below and is provided as a smaller size than the diameter of the corresponding cavity 112. During a process of press-forming the core outer layer, the upper mold 110, the lower mold 120, and the intermediate mold 130 are engaged with one another as a single body in such a way that the protrusion 132 is contained in the cavity 112, thereby forming the core outer layer in a space between the cavity 112 and the protrusion 132 (refer to FIG. 2).

In this case, a central portion of the protrusion 132 may be cut to be flat. A reason thereof is to stably put a unit body 26 for forming an outer layer, which will be described below, on the central portion of the protrusion 132 and simultaneously to allow a material of a cup-shaped outer layer to be out as a volume of the cut part while cross-linking the inner layer with the cup-shaped outer layer by pressing the same, thereby cross-linking the cup-shaped outer layer with the inner layer while being fully filled with no vacant space.

Additionally, a fastening pin 26 is protruded from the central portion of the protrusion 132 to fasten the unit body 26 for forming the outer layer. The fastening pin 26 allows the unit body 26 for forming the outer layer to be more stably located on the protrusion 132 before forming to easily form the outer layer and to improve yield.

Figure 11:
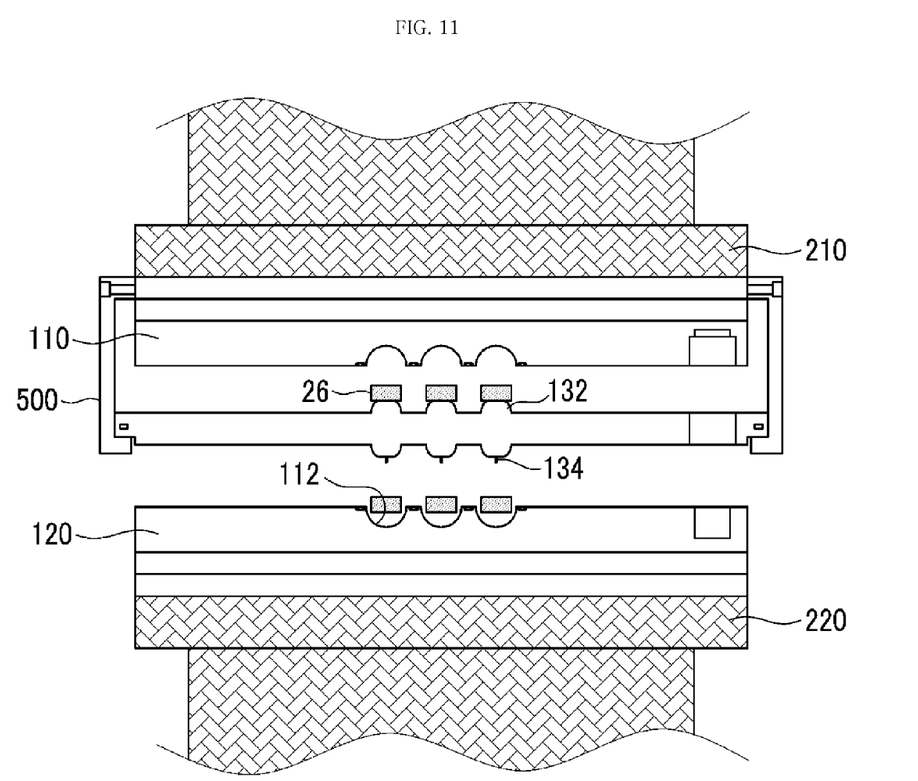
FIG. 11 is a configuration view illustrating an apparatus for forming a golf ball viewed from a side of FIG. 1.

The intermediate mold 130 engages with the upper mold 110 and the lower mold 120 and is provided to for a cup-shaped outer layer of a multilayer core. After forming the cup-shaped outer layer, simultaneously with or after the upper mold 110 and the lower mold 130 are separated, the intermediate mold 130 will enter or exit within and without a transfer path of the upper mold 110 and/or the lower mold 120. The intermediate mold 130 is driven by a drive device such as a cylinder 400 and is guided to enter and exit by a pair of guide rails 500 (refer to FIG. 11) fastened to the upper press 210.

Also, the pair of guide rails 500 accurately disposes the intermediate mold 130 between the upper mold 110 and the lower mold 120 during a process of forming an outer layer 24.

In a process of forming a multilayer core structure of a golf ball by using the forming apparatus 10, the upper mold 110, the lower mold 120, and the intermediate mold 130 will be engaged with and separated from one another. According to the disclosed embodiment, an engagement process in the process of forming the cup-shaped outer layer is performed by transferring the lower press 220 mounted with the lower mold 120 upwardly while the upper press 210 mounted with the upper mold 110 is being fastened, thereby engaging the intermediate mold 130 with the lower mold 120 and sequentially engaging an assembly of the intermediate mold 130 and the lower mold 120 with the upper mold 110. A separation process is performed in a reverse order thereof. An engagement process in a process of cross-linking the cup-shaped outer layer with the inner layer, the upper mold 110 and the lower mold 120 are engaged with and separated from each other according the driving method while the intermediate mold 130 is being carried out outwardly.

Merely, in the present embodiment, the engagement and separation processes are intended to be performed through driving the lower press 220 mounted with the lower mold 120 but are not limited thereto. For example, a way, in which the upper mold 110 is transferred while the lower mold 120 is being fastened, or a way, in which the lower mold 120 and the upper mold 110 are all transferred, is available.

Figure 9:
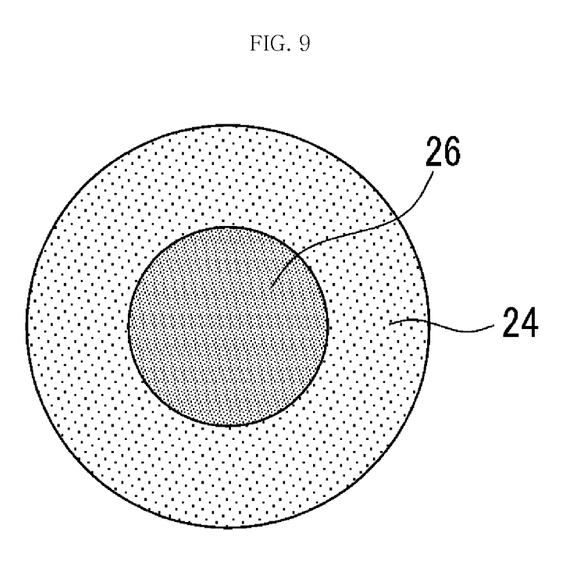
FIG. 9 is a cross-sectional view illustrating a dual core of the golf ball having the multilayer structure.

Hereinafter, a method of manufacturing a golf ball having a multilayer structure by using the forming apparatus 10 according to an embodiment of the present invention will be described. Referring to FIG. 9, a multilayer core of a golf ball is configured by cross-linking the inner layer 22 with the outer layer 24. Generally, a process of forming the multilayer core 20 is performed by forming a pair of cup-shaped outer layers 24 as being cross-linked by using a press process and then locating and pressing the inner layer 22 having a globular shape, previously formed, between the pair of cup-shaped outer layers 24 to be cross-linked with one another.

Referring to FIG. 1, while the upper press 210 mounted with the upper mold 110 is being separated from the lower press 220 mounted with the lower mold 120 with a certain distance, the intermediate mold 130 is located therebetween. The unit bodies 26 for forming outer layers are put on the cavities 112 of the lower mold 120 and the protrusions 132 of the intermediate mold 130, respectively. A material of the unit body 26 for forming the outer layer may be polybutadiene rubber, etc.

Figure 12:
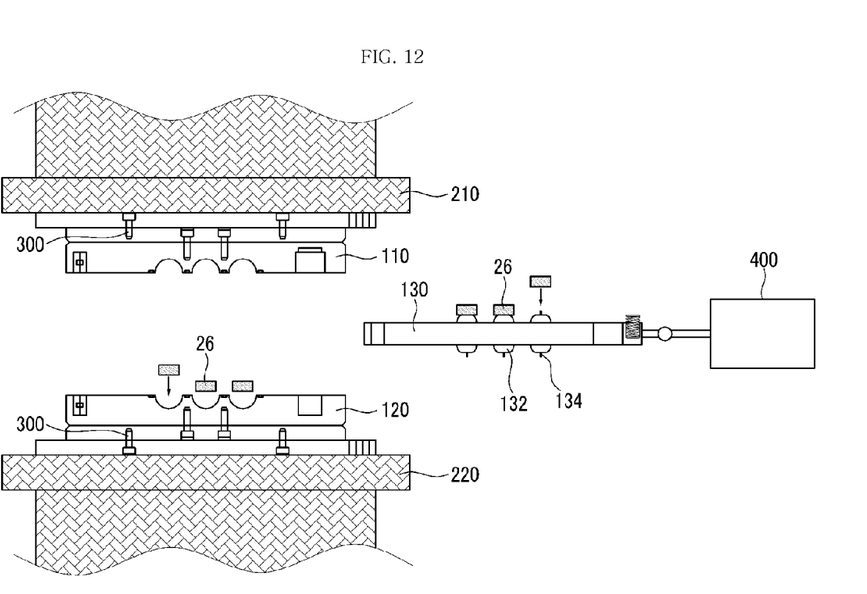
FIG. 12 is a process view illustrating an operation of locating a unit body for forming an outer layer of a golf ball having a multilayer structure according to another embodiment of the present invention.

In this case, the unit body 26 for forming the outer layer may be put on the protrusion 132 of the intermediate mold 130 while the intermediate mold 130 is being located between the upper mold 110 and the lower mold 120 as shown in FIG. 1, or may be located between the upper mold 110 and the lower mold 120 after being located while the intermediate mold 130 is being located outside as shown in FIG. 12.

A volume of the unit body 26 for forming the outer layer may correspond to a volume of the cup-shaped outer layer 24 formed through a press process, and a shape thereof is not particularly limited.

Figure 2:
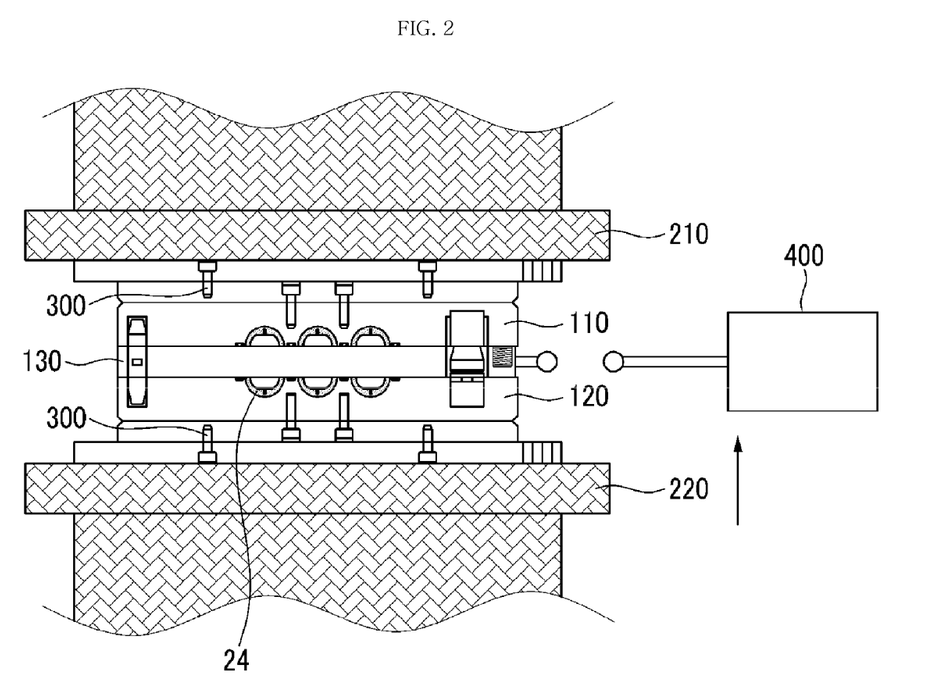
FIG. 2 is a process view illustrating an operation of forming a pair of cup-shaped outer layers of the golf ball having the multilayer structure.

Referring to FIG. 2, while the unit body 26 for forming the outer layer is put in the cavity 112 of the lower mold 120 and on the protrusion 132 of the intermediate mold 130, the lower press 220 mounted with the lower mold 120 is transferred upwardly and engaged with the intermediate mold 130 appropriately disposed on the guide rail 500 in such a way that the protrusion 132 formed on a bottom of the intermediate mold 130 is contained in the cavity 112 of the lower mold 120 and continuously the assembly of the intermediate mold 130 and the lower mold 120 is engaged while being transferred toward the upper mold 110, thereby allowing the protrusion 132 formed on a top of the intermediate mold 130 to be contained in the cavity 112 of the upper mold 110. While the upper mold 110, the intermediate mold 130, and the lower mold 120 are being fully closely attached to one another, a certain separation space is formed between the cavities 112 of the upper and lower molds 110 and 120 and the protrusions 132 formed on the top and bottom of the intermediate mold 130 corresponding thereto and is maintained at certain temperature and time, thereby forming the pair of cup-shaped outer layers 24 semi-cross-linked in the separation space.

In this case, the temperature and time for curing the outer layer 24 to be semi-cross-linked may be appropriately selected according to materials used therefore. In the case of polybutadiene rubber may be maintained at a temperature of 100° C. for about three to five minutes.

On the other hand, the protrusion 132 formed on the top of the intermediate mold 130 may be cut at a central portion thereof to be flat, in which central portions of the pair of cup-shaped outer layers 24 may be formed to be flat.

Figure 3:
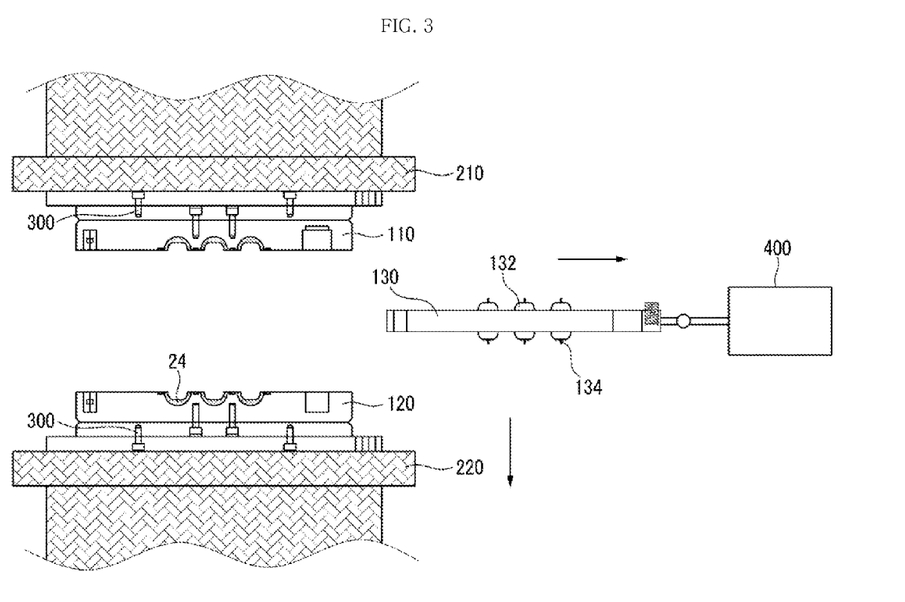
FIG. 3 is a process view illustrating an operation of carrying out an intermediate mold after separating an upper mold from a lower mold.

Referring to FIG. 3, the pair of cup-shaped outer layers 24 is formed to be semi-cross-linked and the lower press 220 is transferred downwardly to separate the upper mold 110 and the lower mold 120 from each other and the intermediate mold 130 is carried outwardly along the guide rail 500 by using the cylinder 400. In this case, the pair of semi-cross-linked cup-shaped outer layers 24 formed in the operation shown in FIG. 2 remain in the cavities 112 of the upper mold 110 and the lower mold 120.

Figure 4:
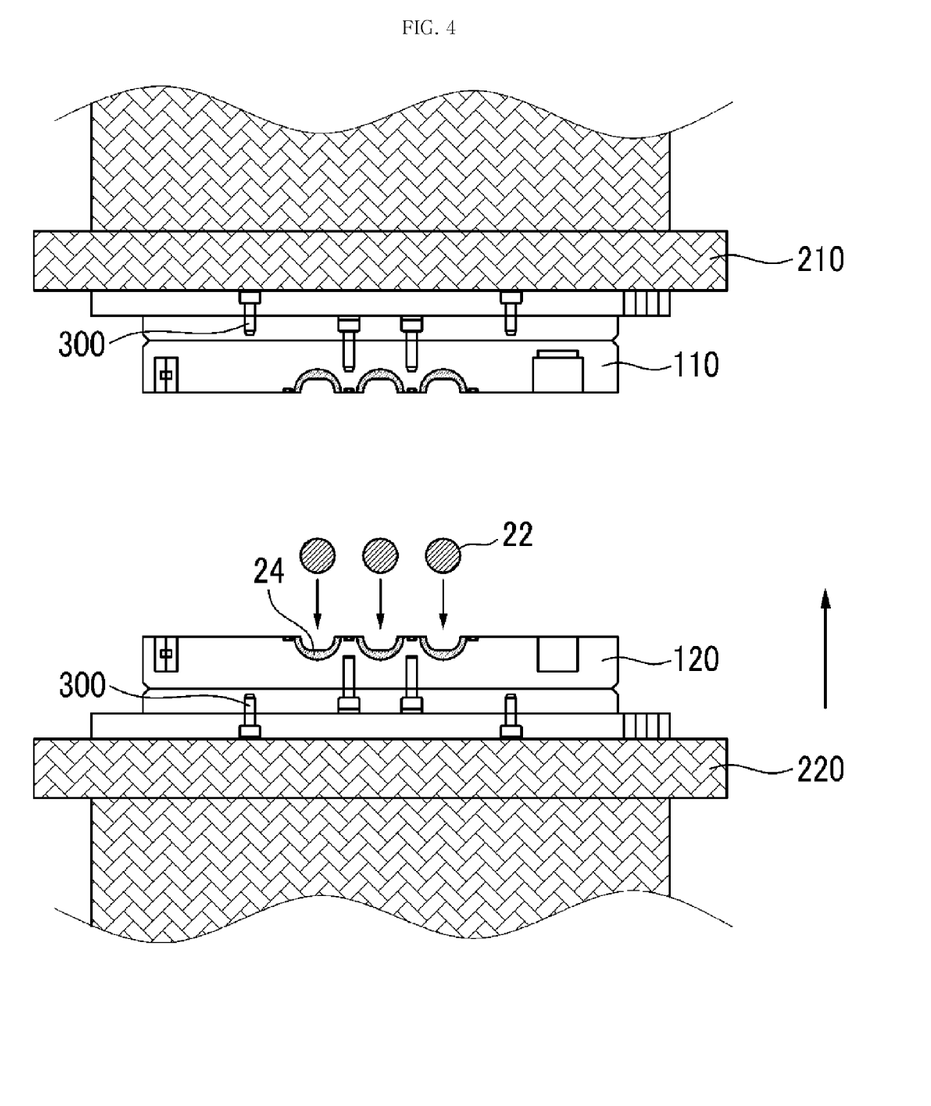
FIG. 4 is a process view illustrating an operation of locating an inner layer of the golf ball having the multilayer structure.

Referring to FIG. 4, the inner layer 22 previously formed is located in the cavity 112 of the lower mold 120 containing the pair of semi-cross-linked cup-shaped outer layer 24. The inner layer is previously formed to be cross-linked before being inserted into the cavity 112. In this case, the inner layer 22 may be fully cross-linked to prevent deformation and eccentricity in the core having the multilayer structure, occurring in an insertion process.

Figure 5:
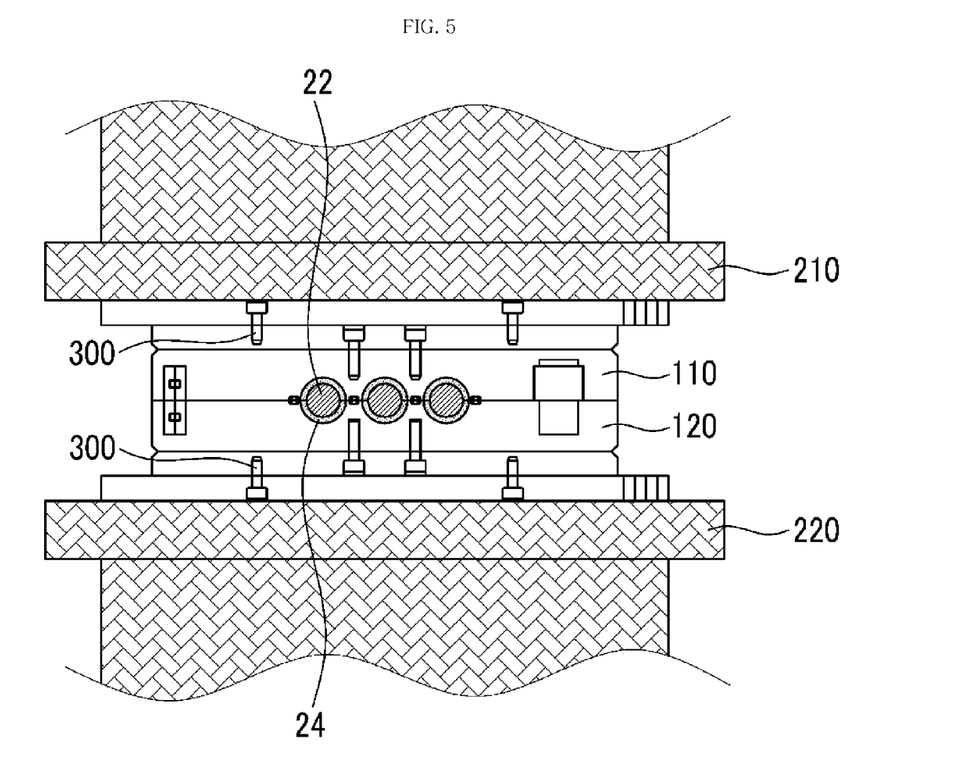
FIG. 5 is a process view illustrating an operation of cross-linking the pair of cup-shaped outer layers with the inner layer.

Referring to FIG. 5, as shown in FIG. 2, the lower press 220 mounted with the lower mold 120 is engaged with the upper mold 110 mounted on the upper press 210 while being transferred upwardly and the pair of semi-cross-linked cup-shaped outer layers 24 and the cross-linked inner layer 22 go through a certain aging time, thereby finishing the core having the multilayer structure. In this case, as described above, since thicknesses of the central portions of the pair of cup-shaped outer layers 24 manufactured by cutting the central portion of the protrusion 132 formed on the top of the intermediate mold 130 are greater than those of other parts, during a process of being cross-linked with the inner layer 22, an extra material of the central portions of the outer layers 24 are uniformly distributed to the entire surface in contact with the inner layer 22 and are extruded out of the intermediate mold 130, thereby fully filling a space between the inner layer 22 and the outer layer 24.

Figure 6:
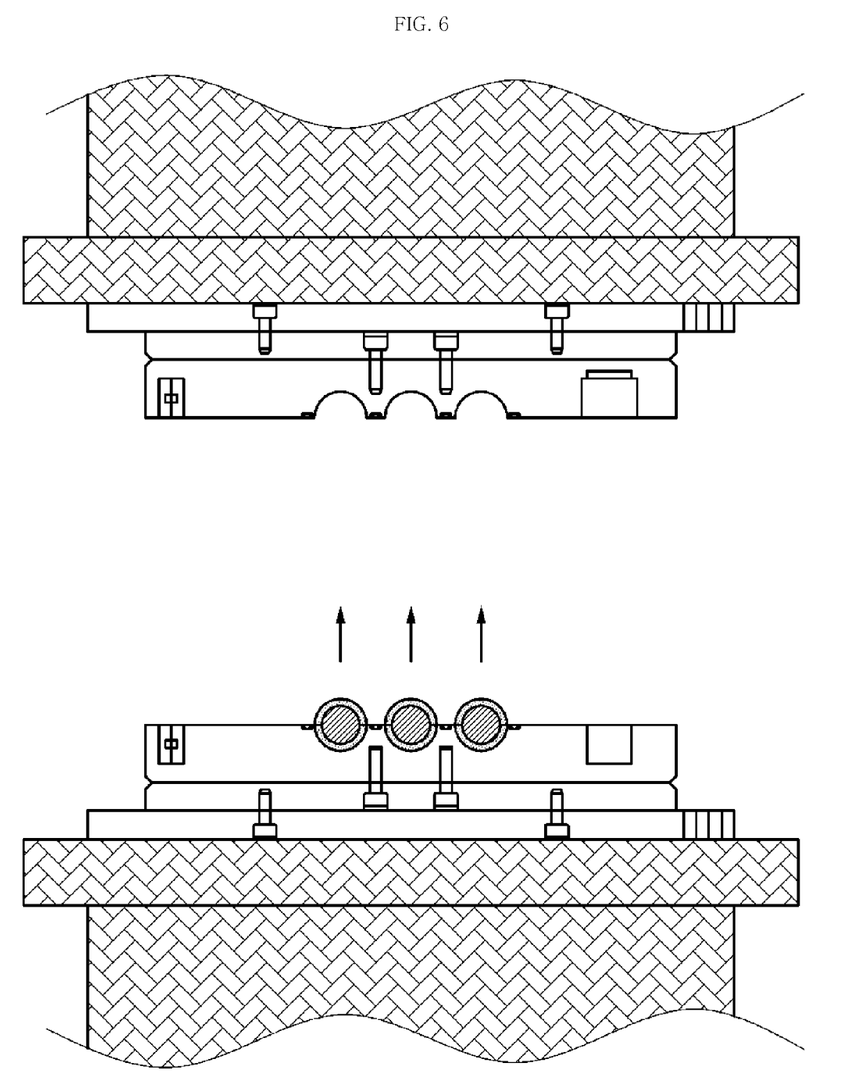
FIG. 6 is a process view illustrating an operation of taking out a core layer of the finished golf ball having the multilayer structure.

Referring to FIG. 6, after completing the process of cross-linking the inner layer 22 with the outer layer 24, as shown in FIG. 3, the lower press 220 is transferred downwardly to separate the upper mold 110 and the lower mold 120 from each other and the finished core having the multilayer structure is taken outwardly, thereby completing the manufacturing process.

Figure 10:
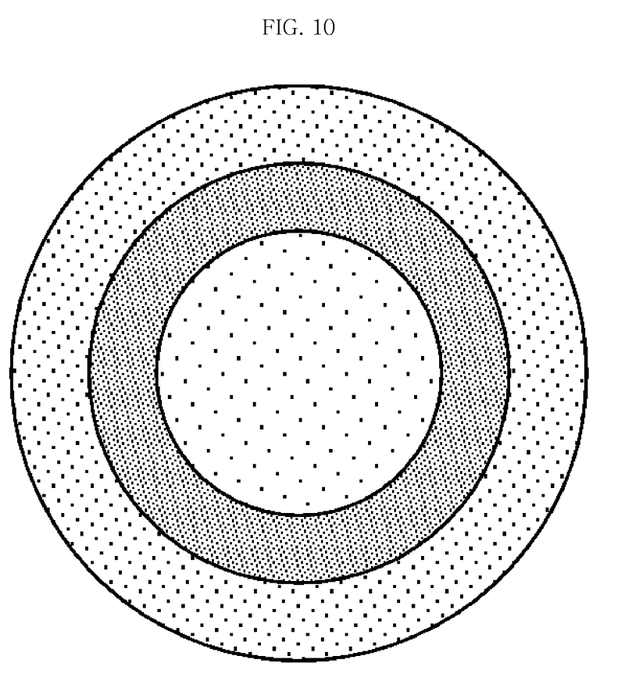
FIG. 10 is a cross-sectional view illustrating a triple core of the golf ball having the multilayer structure.

FIG. 9 is a cross-sectional view illustrating a core having a double layer, manufactured by the operations of FIGS. 2 to 6. The outside of the core may be covered using a cover by a general injection molding process. Also, if necessary, the core having the double layers is used as an inner layer and the operations of FIGS. 2 to 6 are performed repetitively, thereby forming a core having three or more layers shown in FIG. 10

As described above, exemplary embodiments of the present invention have been described. The embodiments, disclosed for description, will not be understood as limiting the scope of the present invention and will be understood as being variously changed and modified by a person with ordinary skill within the thought of the present invention. Accordingly, all these modifications and changes may be understood as corresponding to the scope of the present invention disclosed in claims or equivalents thereof.

The invention claimed is:

1. A method of manufacturing a golf ball having a multilayer structure by using a forming apparatus comprising an upper mold and a lower mold comprising a plurality of hemispheric cavities, respectively, and an intermediate mold comprising a plurality of protrusions having smaller diameters than those of the cavities, on a top and a bottom to correspond to the cavities, the method comprising:

(a) locating a unit body for forming an outer layer onto each of the protrusions on the top of the intermediate mold and into each of the cavities of the lower mold while the upper mold and the lower mold are being separated from each other with a certain space therebetween and the intermediate mold is disposed in the space;

(b) forming cup-shaped outer layers each having a central portion having a thickness greater than that of other portion of each cup-shaped outer layer by locating the protrusions each having a central portion cut to be flat on the top and bottom of the intermediate mold in corresponding cavities of the upper mold and the lower mold, respectively, wherein each protrusion includes a pin protruded from the central portion of each protrusion for fastening the unit body onto each protrusion;

(c) separating the upper mold and the lower mold from each other while the pair of semi-cross-linked cup-shaped outer layers are attached to the inside of the cavities;

(d) taking the intermediate mold outwardly;

(e) locating inner layers having a globular shape, previously formed, in the cavities of the lower mold; and (f) cross-linking the pair of cup-shaped outer layers with the globular inner layers by facing the upper mold and the lower mold with each other.

2. The method according to claim 1, wherein the operations of (b) and (c) are performed by transferring the lower mold vertically while fastening the upper mold.

3. The method according to claim 1, wherein a radius of each protrusion is identical to that of the inner layer.

4. The method according to claim 1, wherein the intermediate layer is taken outwardly by using a cylinder in the operation of (d).

5. The method according to claim 1, further comprising an element for disposing the intermediate mold between the upper mold and the lower mold.

6. A method of manufacturing a golf ball having a multilayer structure by using a forming apparatus comprising an upper mold and a lower mold comprising a plurality of hemispheric cavities, respectively, and an intermediate mold comprising a plurality of protrusions having smaller diameters than those of the cavities, on a top and a bottom to correspond to the cavities, the method comprising:

(a) separating the upper mold and the lower mold from each other and locating a first unit body into a cavity of the lower mold;

(a-1) locating a second unit body onto a protrusion on the top of the intermediate mold such that the second unit body faces an upward direction;

(a-2) locating the intermediate mold between the upper mold and the lower mold;

(b) forming cup-shaped outer layers each having a central portion having a thickness greater than that of other portion of each cup-shaped outer layer by locating the protrusions each having a central portion cut to be flat on the top and bottom of the intermediate mold in corresponding cavities of the upper mold and the lower mold, respectively, wherein each protrusion includes a pin protruded from the central portion of each protrusion for fastening the unit body onto each protrusion;

(c) separating the upper mold and the lower mold from each other while the pair of semi-cross-linked cup-shaped outer layers are attached to the inside of the cavities;

(d) taking the intermediate mold outwardly;

(e) locating inner layers having a globular shape, previously formed, in the cavities of the lower mold; and (f) cross-linking the pair of cup-shaped outer layers with the globular inner layers by facing the upper mold and the lower mold with each other.

7. The method according to claim 6, wherein the operations of (b) and (c) are performed by transferring the lower mold vertically while fastening the upper mold.

8. The method according to claim 6, wherein a radius of each protrusion is identical to that of the inner layer.

9. The method according to claim 6, wherein the intermediate layer is taken outwardly by using a cylinder in the operation of (d).

10. The method according to claim 6, further comprising an element for disposing the intermediate mold between the upper mold and the lower mold.

* * * * *